(12) United States Patent
Gao et al.

(10) Patent No.: US 11,699,244 B2
(45) Date of Patent: Jul. 11, 2023

(54) PLANAR CODING TARGET FOR VISION SYSTEM AND REAL-TIME POSE MEASUREMENT METHOD THEREOF

(71) Applicant: Guangdong University of Technology, Guangzhou (CN)

(72) Inventors: Jian Gao, Guangzhou (CN); Yuanyang Wei, Guangzhou (CN); Lanyu Zhang, Guangzhou (CN); Yongbin Zhong, Guangzhou (CN); Haixiang Deng, Guangzhou (CN); Yun Chen, Guangzhou (CN); Xin Chen, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 17/988,096

(22) Filed: Nov. 16, 2022

(65) Prior Publication Data

US 2023/0070287 A1    Mar. 9, 2023

(30) Foreign Application Priority Data

Dec. 31, 2021 (CN) .......................... 202111672226.2

(51) Int. Cl.
  *G06K 9/00*   (2022.01)
  *G06T 7/70*   (2017.01)
  *G06T 9/00*   (2006.01)
(52) U.S. Cl.
  CPC ................ *G06T 7/70* (2017.01); *G06T 9/001* (2013.01)

(58) Field of Classification Search
  CPC .................................................... G06V 10/469
  See application file for complete search history.

(56) References Cited

U.S. PATENT DOCUMENTS 7,813,822 B1 * 10/2010 Hoffberg ................ H04N 7/163
                                                          381/73.1
9,147,252 B2 *  9/2015 Davis ........................ G06T 7/73
(Continued)

FOREIGN PATENT DOCUMENTS

CN         107270875 A      10/2017
CN         107689061 A       2/2018
(Continued)

OTHER PUBLICATIONS

Zongming Qiu et al., Guideless coordinate measurement technology using coding target, Proc. SPIE 7130, Fourth International Symposium on Precision Mechanical Measurements.
(Continued)

*Primary Examiner* — Hadi Akhavannik

(57) ABSTRACT

A real-time pose measurement method of a planar coding target for a vision system. The planar coding target includes a plurality of coding elements, a coding block, a coding template, a minimum identification unit pattern and a coding pattern. Each coding element has a unique coding value, and serial numbers of the coding elements are different from each other. The coding block includes four coding elements that are distributed in the same rectangle ABCD and do not overlap with each other. A center of the coding block is an intersection point O of two diagonals of the rectangle ABCD. A coding value of the coding block is associated with coding values of the four coding elements contained therein.

9 Claims, 12 Drawing Sheets

(56) References Cited

U.S. PATENT DOCUMENTS

| | | | | |
|---|---|---|---|---|
| 9,679,224 | B2* | 6/2017 | Barker | G06F 18/2193 |
| 10,147,433 | B1* | 12/2018 | Bradley | G10L 19/018 |
| 10,236,031 | B1* | 3/2019 | Gurijala | G10L 19/018 |
| 2018/0137637 | A1* | 5/2018 | Cho | G06T 7/521 |
| 2019/0171856 | A1* | 6/2019 | Sharma | G06K 19/06103 |

FOREIGN PATENT DOCUMENTS

| | | |
|---|---|---|
| CN | 109242957 A | 1/2019 |
| CN | 110763204 A | 2/2020 |
| CN | 112184803 A | 1/2021 |
| CN | 112184825 A | 1/2021 |
| CN | 113096191 A | 7/2021 |
| CN | 113112550 A | 7/2021 |
| CN | 113129385 A | 7/2021 |
| CN | 113129386 A | 7/2021 |
| CN | 113160329 A | 7/2021 |
| KR | 20190091217 A | 8/2019 |
| WO | 2015086718 A2 | 6/2015 |

OTHER PUBLICATIONS

Min Zhao et al., Holographis Coding Target and Image Backprojection Correction Matching, Acta Optica Sinica, Issue 6, 2020, pp. 80-88.

* cited by examiner

PLANAR CODING TARGET FOR VISION SYSTEM AND REAL-TIME POSE MEASUREMENT METHOD THEREOF

CROSS-REFERENCE TO RELATED APPLICATIONS

This application claims the benefit of priority from Chinese Patent Application No. 202111672226.2, filed on Dec. 31, 2021. The content of the aforementioned application, including any intervening amendments thereto, is incorporated herein by reference in its entirety.

TECHNICAL FIELD

This application relates to computer vision technology, and more particularly to a planar coding target for a vision system and a real-time pose measurement method thereof.

BACKGROUND

In the field of computer vision measurement technology, the pose measurement mainly includes monocular vision pose measurement, binocular vision pose measurement and multi-vision pose measurement. Due to advantages of simple structure, easy implementation, and strong real-time measurement performance, the monocular vision pose measurement has been widely applied to the motion pose tracking, robotic arm end guiding and automobile manufacturing accuracy detection. A typical monocular vision measurement system includes a target, a visual image acquisition device, and a processing device such as computer, where the target commonly is a checkerboard, a circle array target, a two-dimensional code target, a circular coding target, a point distribution coding target, or a color coding target. The checkerboard and the circle array target are frequently applied to visual calibration and pose measurement, and during the pose measurement, it is necessary to ensure that the entire target is located within the measurement visual field. The two-dimensional code target performs position coding according to the encoding information contained therein, and has poor real-time identification performance. The coding information of the circular coding target is merely distributed on the circular coding strip, leading to small coding information capacity. The point distribution coding target performs coding based on the geometric position relationship between coding points, and each group of coding points has a specific coding rule, such that it is difficult to realize the coding of a large-range target. The color coding target gives color information to each coding unit to increase the coding capacity, but the complexity of extraction and identification algorithms is also increased. With respect to the above-mentioned coding targets, it is required to ensure that the coding patterns are completely or mostly located in the measurement visual field, so that it fails to simultaneously realize high-precision, large-range and real-time measurement. Therefore, it is urgently needed to design a coding target to meet the high-precision, large-range and real-time measurement.

SUMMARY

An objective of this application is to provide a planar coding target for a vision system, which has advantages of high precision, large coding range and strong real-time identification capability to remedy the defects in the existing technologies.

Another objective of this application is to provide a real-time pose measurement method of the planar coding target, in which the real-time pose measurement can be achieved only by acquiring any local coding patterns that meet the identification requirements, so as to simultaneously realize the high-precision, large-range and real-time pose measurement.

Technical solutions of this application are described as follows.

This application provides a planar coding target, comprising:
  a plurality of coding elements;
  a coding block;
  a coding template;
  a minimum identification unit pattern; and
  a coding pattern;
  wherein each of the plurality of coding elements has a unique coding value; and
  coding values of the plurality of coding elements are different from each other;
  the coding block comprises four coding elements; the four coding elements are distributed in a rectangle ABCD and do not overlap with each other; a center of the coding block is an intersection point O of two diagonals of the rectangle ABCD; the coding block has a coding value; wherein the coding value of the coding block is associated with a coding value of each of the four coding elements contained in the coding block;
  the coding block is a special coding block or a conventional coding block; in the special coding block, gravity centers of three of the four coding elements are respectively located at vertexes B, C, D of the rectangle ABCD, and a gravity center of the remaining one of the four coding elements is located in a triangle enclosed by the vertexes A, B and C, and is defined as point E;
  in the conventional coding block, gravity centers of the four coding elements are respectively located at vertexes A, B, C and D of the rectangle ABCD;
  the coding template is composed of at least one coding block with determined mutual position and arrangement relationship; the at least one coding block comprises at least one special coding block; the coding template is configured to mark the at least one coding block each with an integer serial number according to a preset order, so as to generate a sequence of the at least one coding block;
  a pattern of the coding template is the minimum identification unit pattern; according to the sequence of the at least one coding block on the coding template, coding values of the at least one coding block are obtained in turn to form a sequence $[V_0, V_1, \ldots, V_{k-1}]$ of the minimum identification unit pattern; wherein $V_0, V_1, \ldots, V_{k-1}$ are coding values of each of the at least one coding block and K is the number of the at least one coding block in the coding template;
  the coding value sequence of the minimum identification unit pattern is unique, and coding value sequences of different minimum identification unit patterns are different from each other;
  the coding pattern is generated through continuous movement and expansion of the coding template; the coding pattern covers a surface of a target board; the coding pattern is provided with a coding information matrix corresponding to a generated coding pattern; and the coding information matrix is configured to store type and coding value of each coding block contained in the coding pattern.

In an embodiment, the real-time pose measurement method is applied to a vision system comprising the planar coding target, an image acquisition device and a data processing device; the image acquisition device is configured to capture an image of the planar coding target and send the image of the planar coding target to the data processing device for processing; the real-time pose measurement method comprises:

(1) generating, by the data processing device, a coding pattern according to requirements of a measurement scene and arranging the coding pattern on the surface of the target board, so as to form the planar coding target;

(2) establishing, by the data processing device, a coordinate system O-UV of the image of the planar coding target, a coordinate system $O_c$-$X_c Y_c Z_c$ of the image acquisition device and a coordinate system $O_w$-$X_w Y_w Z_w$ of the planar coding target;

(3) solving a rotation matrix R and a translation matrix T by using a perspective-n-point (PnP) algorithm, wherein the rotation matrix R is configured to transform coordinates of a point from the coordinate system $O_w$-$X_w Y_w Z_w$ to the coordinate system $O_c$-$X_c Y_c Z_c$, and the translation matrix T is configured to transform coordinates of a point from the coordinate system $O_w$-$X_w Y_w Z_w$ to the coordinate system $O_c$-$X_c Y_c Z_c$;

(4) acquiring a coordinate transformation relationship of an object to be measured between the coordinate system $O_c$-$X_c Y_c Z_c$ and the coordinate system $O_w$-$X_w Y_w Z_w$, expressed as $P_c = R \cdot P_w + T$; wherein $P_c$ represents a coordinate of the object to be measured in the coordinate system $O_c$-$X_c Y_c Z_c$; and $P_w$ represents a coordinate of the object to be measured in the coordinate system $O_w$-$X_w Y_w Z_w$; and (5) continuously shooting, by the image acquisition device, a local coding pattern of the planar coding target during movement of the object to be measured; and calculating, by the data processing device, a pose change of the object to be measured in real time in the coordinate system $O_w$-$X_w Y_w Z_w$ relative to the coordinate system $O_c$-$X_c Y_c Z_c$.

Compared with the prior art, this application has the following beneficial effects.

With regard to the planar coding target for the vision system, the coded area is expanded by continuously moving the coding template to generate the coding value for the uncoded areas. During the expansion and generation of the coding pattern, the coding value sequence conforming to the minimum identification unit pattern of the coding template is unique, such that it is achievable to code in a wide range. Relatively speaking, a large planar encoding target covers a wide range, and only a small part of the minimum identification unit pattern needs to be shot to know the specified location of the small part in the planar coding target.

In the real-time pose measurement method of the planar coding target for the vision system, it only requires to collect any local coding pattern that meets the recognition requirements to realize the pose measurement, which simultaneously realizes the high-precision, large-range and real-time measurement. Moreover, the planar coding target is configured to encode different areas in a wide range to determine the positions of different areas, and meet the needs of high-precision pose measurement for a wide range.

Figure 1:
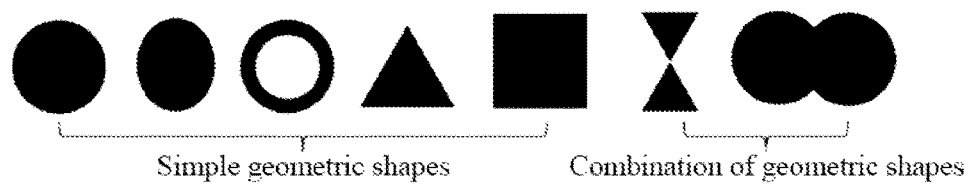
FIG. 1 is a structural diagram of coding element according to an embodiment of this application.

In the drawings, 11: coding element; 12: special coding block; 13: conventional coding block; 14: coding template; 15: minimum identification unit pattern; 16: coding pattern; 2: target board; 3: image acquisition device; and 4: data processing device.

DETAILED DESCRIPTION OF EMBODIMENTS

This application will be described in detail below with reference to the accompanying drawings and embodiments. The same or similar reference numerals refer to the same or similar elements or elements having the same or similar functions throughout this application. The embodiments described below with reference to the accompanying drawings are merely exemplary and illustrative, and should not be construed as limiting this application.

It should be noted that as used herein, unless otherwise specified, terms "installation", "link", "connection" and "arrangement" should be interpreted broadly. For example, the connection can be a fixed connection, a detachable connection or an integral connection; mechanical connection or electrical connection; direct connection or indirect connection through an intermediate medium; or internal communication between two components. For those of ordinary skill in the art, the specific meaning of the above terms in this application can be determined according to the specific situation.

This application provides a planar coding target for a vision system. Referring to FIGS. 1-5, the planar coding target includes a plurality of coding elements 11, a coding block, a coding template 14, a minimum identification unit pattern 15 and a coding pattern 16. The plurality of coding elements 11 each have a unique coding value, and the coding values of the plurality of coding elements are different from each other.

The coding block includes four of the plurality of coding elements 11. The four coding elements 11 are distributed in a rectangle ABCD and do not overlap with each other. A center of the coding block is an intersection point O of two diagonals of the rectangle ABCD. The coding block has a coding value, where the coding value is associated with a coding value of each of the four coding elements 11 contained in the coding block.

The coding block is a special coding block 12 or a conventional coding block 13. In the special coding block 12, gravity centers of three of the four coding elements 11 are respectively located at vertexes B, C, D of the rectangle ABCD, and a gravity center of the remaining one of the four coding elements 11 is located in a triangle enclosed by the vertexes A, B and C, and is defined as point E.

In the conventional coding block 13, gravity centers of the four coding elements 11 are respectively located at vertexes A, B, C and D of the rectangle ABCD. Both for the special coding block 12 and the conventional coding block 13, when the coding block pattern is formed, it is required to ensure that the four coding elements 11 are independent from each other and do not overlap mutually.

The coding template 14 is composed of at least one coding block with determined mutual position and arrangement relationship. The at least one coding block includes at least one special coding block 12. The coding template 14 is configured to mark the at least one coding block each with an integer serial number according to a preset order, so as to generate a sequence of the at least one coding block.

A pattern of the coding template 14 is the minimum identification unit pattern 15. According to the sequence of the at least one coding block on the coding template 14 contained in the minimum identification unit pattern 15, coding values of the at least one coding block are obtained in turn to form a sequence $[V_0, V_1, \ldots, V_{k-1}]$ of the minimum identification unit pattern 15. $V_0, V_1, \ldots, V_{k-1}$ are coding values of the at least one coding block, and K is the number of the at least one coding block in the coding template 14.

The coding value sequence of the minimum identification unit pattern is unique, and coding value sequences of different minimum identification unit patterns 15 are different from each other.

The coding pattern 16 is generated through continuous movement and expansion of the coding template 14. The coding pattern 16 covers a surface of a target board 2. The coding pattern 16 is provided with a coding information matrix corresponding to a generated coding pattern. The coding information matrix is configured to store type and coding value of each coding block contained in the coding pattern 16.

In the planar coding target for the vision system, the coding element 11 has a pattern of basic geometric shape. Different coding elements 11 are assigned with different coding information, namely the coding value. The special coding block 12 and the conventional coding block 13 are respectively form by different distributions of the four coding elements 11 on the rectangle ABCD. The special coding block 12 is configured to mark the orientations. The coding template 14 is configured to determine the number of special coding blocks 12 and conventional coding blocks 13 and the distribution relationship among the coding blocks. The coded area is expanded by continuously moving the coding template 14 and generating the coding values for the areas to be coded. During the expansion and generation of the coding pattern, the coding value sequence conforming to the minimum identification unit pattern 15 of the coding template 14 is unique.

Therefore, it is achievable to code in a wide range. Relatively speaking, a large planar encoding target covers a wide range, only a small part of the minimum identification unit pattern 15 needs to be shot to know the specified location of the small part in the planar coding target. In order to facilitate the identification of the coding pattern 16 and the storage of the coding information, appropriate coding template 14 and the way of moving and expanding the coding template 14 are designed, such that all the coding blocks in the coding pattern 16 are distributed spaced apart in a regular array. During the process of generating the coding pattern 16, the coding information is stored in the coding information matrix in units of coding blocks.

In this embodiment, the serial numbers of the plurality of coding elements 11 are respectively 0, 1, . . . , N−2 and N−1, where N is the number of the plurality of coding elements 11.

In the coding block, serial numbers of the four coding elements 11 are obtained clockwise around a center of the coding block in sequence starting from a coding element located at a top-left corner to obtain a serial number sequence $[v_{TL}, v_{TR}, v_{BR}, v_{BL}]$, where $v_{TL}$ is a serial number of the coding element located at the top-left corner; $v_{TR}$ is a serial number of a coding element located at a top-right corner; $v_{BR}$ is a serial number of a coding element located at a bottom-right corner; and $v_{BL}$ is a serial number of a coding element located at a bottom-left corner. The serial number sequence $[v_{TL}, v_{TR}, v_{BR}, v_{BL}]$ is converted into the serial number of the coding block, expressed as follows:

$$V = v_{TL} + N^1 * v_{TR} + N^2 * v_{BR} + N^3 * v_{BL};$$

where V is the coding value of the coding block; and a range of the coding value is $\{V | 0 \leq V \leq N4-1, V \in Z\}$, Z is a symbol of integers in mathematics and is a set of all integers.

Serial numbers of the at least one coding block in the coding template 14 are respectively 0~K−1, where K is the number of at least one coding block in the coding template 14.

It should be noted that even though the coding value of the special coding block 12 is the same as the coding value of the conventional coding block 13, the special coding block 12 and the conventional coding block 13 respectively represent different information, because they belong to different types of coding blocks.

Since the pattern generated by the coding template 14 once is the minimum identification unit during visual measurement, the minimum identification unit pattern 15 is accordingly formed. All the minimum identification unit patterns 15 on the coding pattern 16 are generated by continuous movement and expansion of the same predetermined coding template 14. The coding blocks on the coding template 14 are marked with integer serial numbers in sequence, which are respectively from 0 to K−1 (K is the number of coding blocks on the coding template 14). On the specific minimum identification unit pattern 15, according to the integer serial numbers of the coding blocks on the coding template 14, the coding values of the coding blocks are obtained in turn, which are respectively $V_0, V_1, \ldots, V_{k-1}$. The K coding values are combined in sequence to form a coding value sequence $[V_0, V_1, \ldots, V_{k-1}]$ to represent the coding information of the minimum identification unit pattern. In the coding pattern 16, the serial number sequence is unique, and the coding value sequences corresponding to different minimum identification unit patterns 15 are different from each other. Thus, when any part of the pattern larger than the minimum identification unit pattern 15 is determined, the position of the part of the pattern can be determined in the coding pattern 16.

In this embodiment, the point E is a special coding position. The special coding block 12 is configured to carry rotational orientation information determined based on a relative positional relationship between the point E and the vertex B, vertex C and vertex D.

The special coding block 12 is configured to carry the information of the rotation orientation information, and the four patterns of the special coding block 12 are respectively configured to carry the coding value. Specifically, the orientation is determined according to the distribution positions of the gravity centers the four patterns, and mainly through the relationship between the pattern of the special coding position and the other three gravity centers of the pattern on the rectangle ABCD. The specific pattern is configured to carry the coding value. The coding template 14 is designed to better expand the coding capacity and coding forms.

Figure 2A:
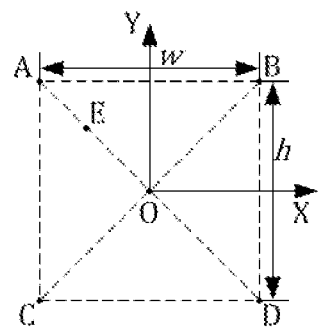
FIG. 2a structurally shows a special coding block according to an embodiment of this application.
Figure 2B:
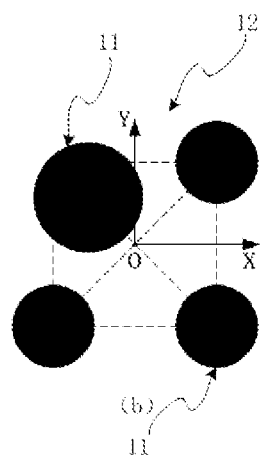
FIG. 2b schematically illustrates distribution of four coding elements in the special coding block according to an embodiment of this application.
Figure 2C:
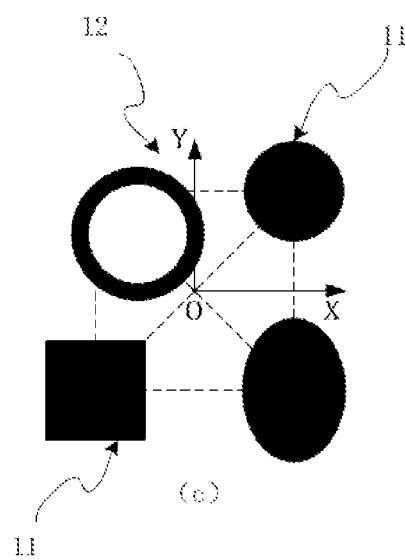
FIG. 2c schematically shows distribution of four coding elements in the special coding block according to another embodiment of this application.
Figure 3A:
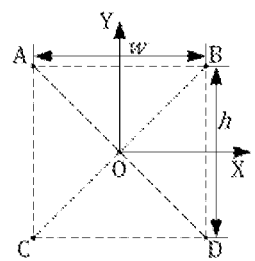
FIG. 3a structurally shows a conventional coding block according to an embodiment of this application.
Figure 3B:
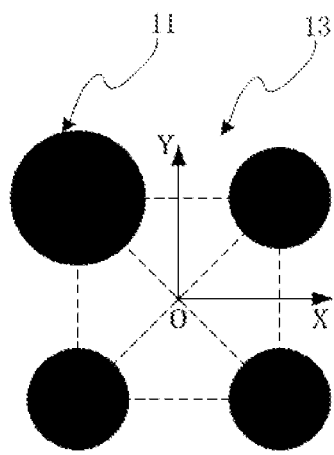
FIG. 3b schematically shows distribution of four coding elements in the conventional coding block according to an embodiment of this application.
Figure 3C:
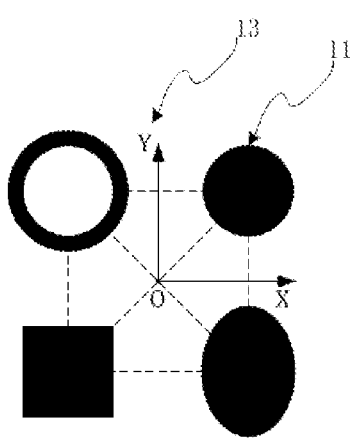
FIG. 3c schematically shows distribution of four coding elements in the conventional coding block according to another embodiment of this application.

The special coding block 12 consists of four coding elements 11, and the distribution of the four coding elements 11 is shown in FIGS. 2b-2c.

In the rectangle ABCD, the length is w (i.e., the length of the coding block) and the width is h (i.e., the width of the coding block). The two diagonals AD and BC intersect at point O, and point E is a point inside a triangle ABC. Gravity centers of the four coding elements 11 are respectively located at the point B, the point C, the point D, and the point E. The point O is regarded as the center of the special coding block 12. The point E is the special coding position. The point O is taken as an origin, a direction parallel to a vector $\overrightarrow{CD}$ in the rectangle ABCD is an X axis direction and a direction parallel to a vector $\overrightarrow{DB}$ in the rectangle ABCD is an Y axis direction, such that a coordinate system O-XY of the special coding block 12 is established. According to the relationships between the point E and the vertex B, the vertex C and the vertex D, the rotation orientation of the special coding block 12 is effectively determined, such that the rotation orientation of the coding pattern 16 is obtained. Therefore, the distribution positions of the coding elements 11 in the special coding block 12 are designed without needing to add extra positioning patterns to distinguish, effectively solving the problem of the rotation orientation, thereby simplifying the coding. Moreover, the pattern of the coding block is configured to carry the coding information, which is relatively straightforward without needing the positioning pattern and the orientation pattern to assist the coding value of the coding block to determine the distribution positions.

In this embodiment, a pattern of each of the plurality of coding elements 11 is a single geometric shape or a combination of multiple geometric shapes. The plurality of coding elements 11 vary in at least one of attributes, where the attributes comprise shape, size, color and transparency.

The at least one special coding block 12 in the coding template 14 is the same in configuration, and a coding pattern 16 is generated by the coding template 14 of the same type.

The plurality of coding blocks in the coding pattern 16 are distributed spaced apart in a regular array. For each of the plurality of coding blocks contained in the coding pattern 16, a distribution position is in one-to-one correspondence to a column and row position in the coding information matrix.

The coding element 11 is a minimum unit that constitutes the coding pattern 16. The coding element 11 can have an easily-recognizable geometric shape, such as circle, ellipse, ring, triangle, quadrilateral and a combination of multiple simple geometric shapes (as shown in FIG. 1). In the plurality of coding elements 11, as long as there is a difference in the attributes including shape, size, color and transparency, the plurality of coding elements 11 are different from each other. For example, circles with different sizes, circles with the same size and different grayscales, circles with the same size and different colors, and circles with the same size and different transparency are all different coding elements 11.

Figure 9:
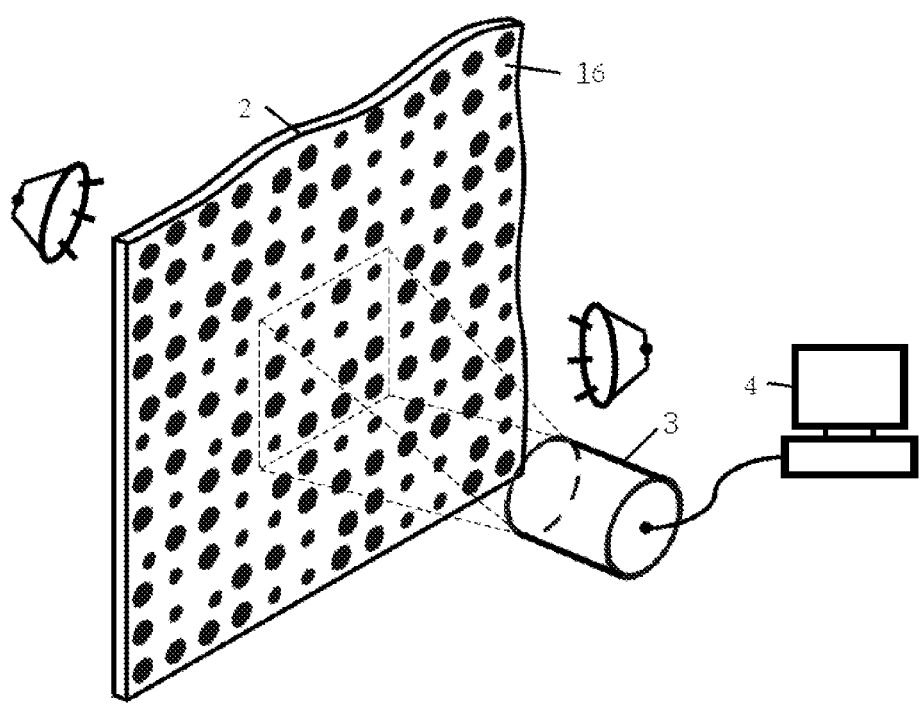
FIG. 9 shows a structure of a vision system according to an embodiment of this application.

In this embodiment, the real-time pose measurement method is applied to a vision system including the planar coding target, an image acquisition device 3 and a data processing device 4, which is shown in FIG. 9. The image acquisition device 3 is configured to capture an image of the planar coding target and send the image of the planar coding target to the data processing device 4 for processing, which is performed as follows.

(1) Target Generation

The data processing device 4 generates a coding pattern 16 according to requirements of a measurement scene, and arrange the coding pattern on the surface of the target board 2, so as to form the planar coding target.

(2) Establishment of Coordinate Systems

The data processing device 4 establishes a coordinate system O-UV of the image, a coordinate system $O_c$-$X_c Y_c Z_c$ of the image acquisition device and a coordinate system $O_w$-$X_w Y_w Z_w$ of the planar coding target.

(3) Coordinate Transformation

According to multiple sets of coordinates $(\mu_i, v_i)$ in the coordinate system O-UV and corresponding sets of coordinates $(x_i, y_i, z_i)$ in the coordinate system $O_w$-$X_w Y_w Z_w$, a rotation matrix R and a translation matrix T are solved by using a perspective-n-point (PnP) algorithm, where the rotation matrix R is configured to transform coordinates of a point from the coordinate system $O_w$-$X_w Y_w Z_w$ to the coordinate system $O_c$-$X_c Y_c Z_c$, and the translation matrix T is configured to transform coordinates of a point from the coordinate system $O_w$-$X_w Y_w Z_w$ to the coordinate system $O_c$-$X_c Y_c Z_c$.

(4) A coordinate transformation relationship of an object to be measured between the coordinate system $O_c$-$X_c Y_c Z_c$ and the coordinate system $O_w$-$X_w Y_w Z_w$ is acquired, and expressed as:

$$P_c = R \cdot P_w + T;$$

where $P_c$ represents a coordinate of the object to be measured in the coordinate system $O_c$-$X_c Y_c Z_c$; and $P_w$ represents a coordinate of the object to be measured in the coordinate system $O_w$-$X_w Y_w Z_w$.

(5) Measurement of Pose Change of the Object to be Measured

The image acquisition device 3 continuously shoots a local coding pattern 16 of the planar coding target, during movement of the object to be measured. The data processing device 4 calculates the pose change of the object to be measured in real time in the coordinate system $O_w$-$X_w Y_w Z_w$ relative to the coordinate system $O_c$-$X_c Y_c Z_c$.

It should be noted that the target board 2 is made of materials with good stability such as strong hardness, low expansion coefficient, and high deformation resistance, such as ceramics, glass-ceramic, invar steel, etc. The surface of the target board 2 requires good flatness facilitating the effective attachment of the coding pattern 16.

The coding pattern 16 is allowed to be arranged on the target board 2 by processes such as printing, laser marking, etching, electroplating, such that the coding pattern 16 can have better accuracy and stability.

The image acquisition device 3 is generally composed of a charge coupled device (CCD)/complementary metal oxide semiconductor (CMOS) camera with an optical lens. The visual field for image acquisition should be larger than the size of the minimum recognition unit pattern 15 of the coding pattern 16 to ensure that a complete minimum recognition unit pattern 15 can be collected for each acquisition. As shown in FIG. 9, the dotted box on the planar coding target is the visual field for image acquisition.

The data processing device 4 is generally a computer, and configured to process the acquired data to obtain measurement results. For occasions needing high real-time capability, the computer performance should also be improved accordingly.

The image acquisition device 3 is in a communication connection to the data processing device 4 through a data transmission line, and configured to perform bidirectional data transmission.

The vision system is allowed to be illuminated under the illumination modes of natural light lighting, front light source or rear light source. Different illumination modes require a good distinction degree between the coding pattern 16 and the target board 2, so as to accurately distinguish the coding pattern 16 and the target board 2. The illumination mode of the front light source can adopt point light source, area light source or LED backlight. In the illumination mode of the rear light source, it is required that the target board should have a certain degree of light transmission properties, such as glass-ceramic.

Figure 10:
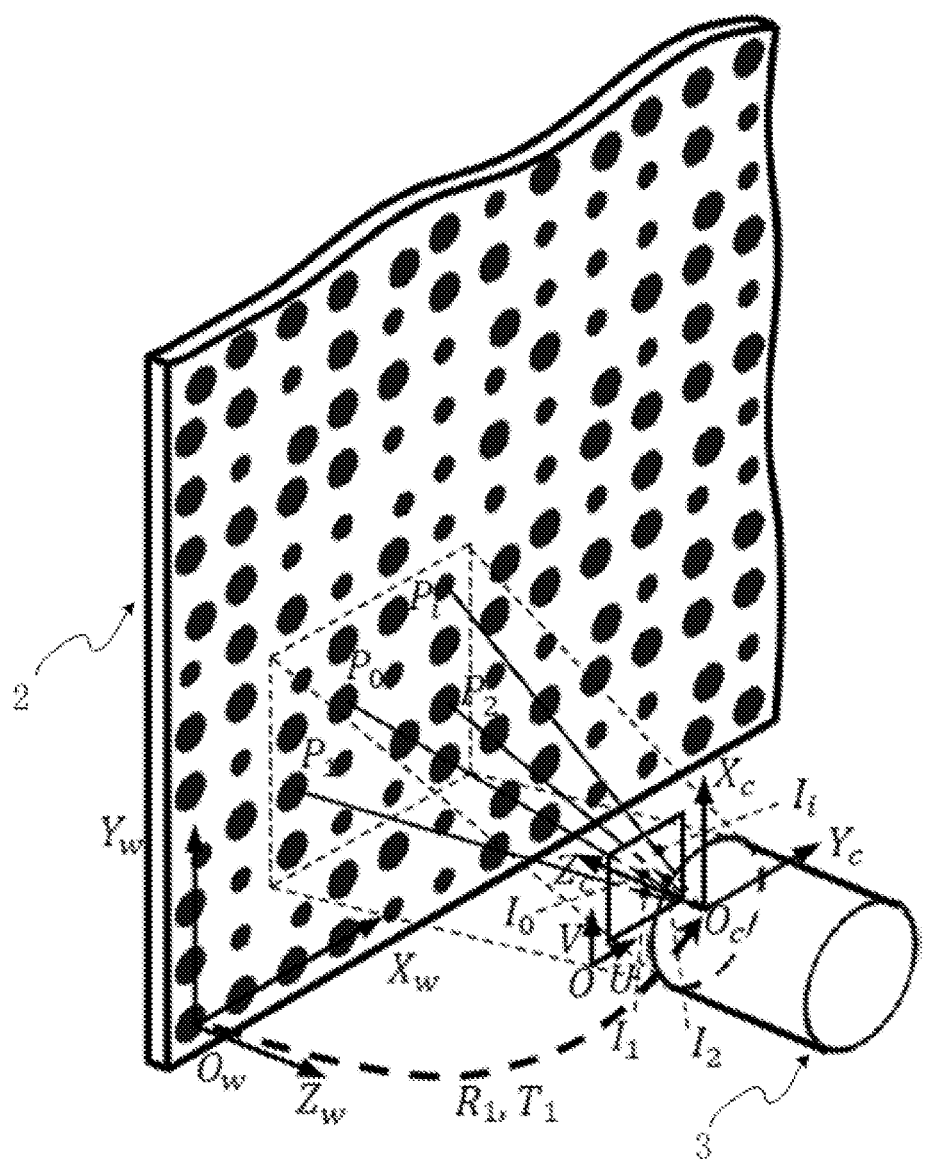
FIG. 10 schematically shows a measurement position 1 according to an embodiment of this application.
Figure 11:
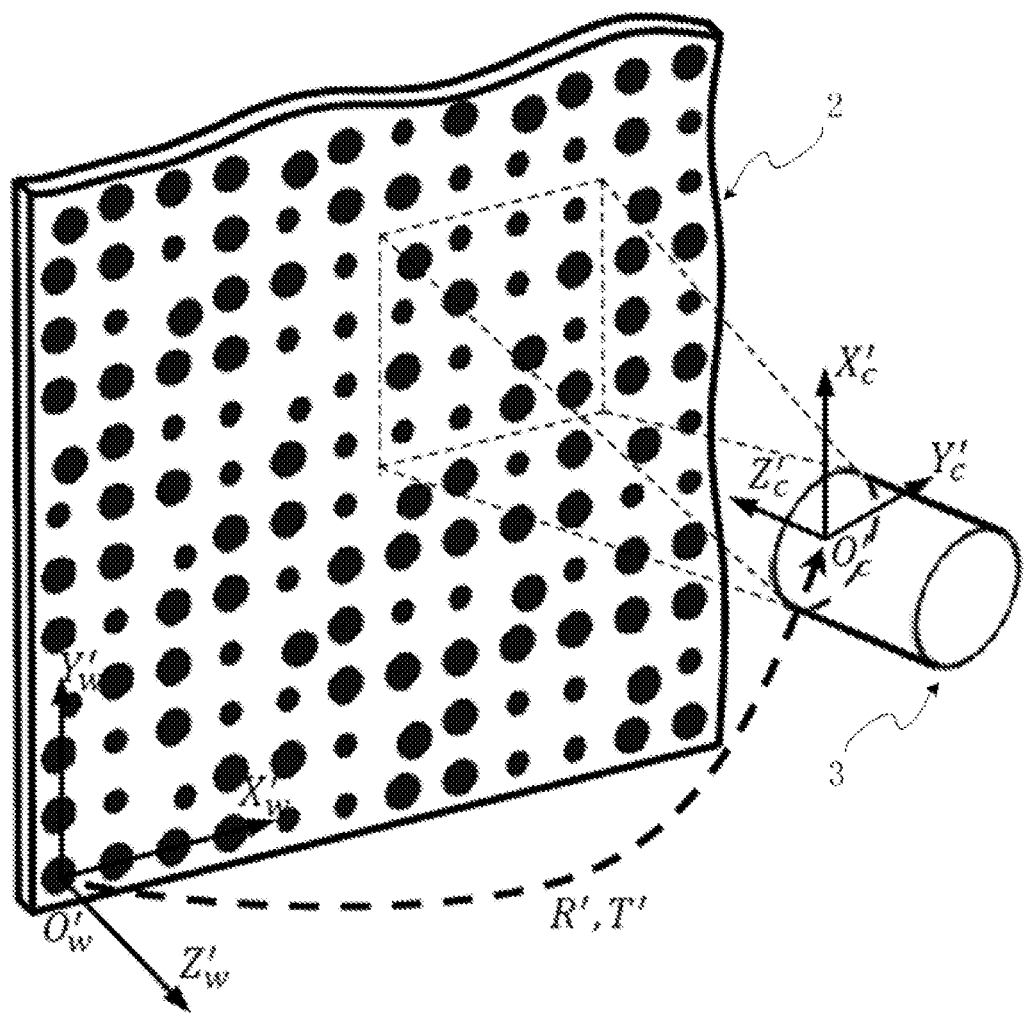
FIG. 11 schematically shows a measurement position 2 according to an embodiment of this application.

FIGS. 9 to 11 show the cross-sections of the target board 2, that is, a local part of the planar coding target. According to different application scenes, planar coding targets with different sizes are allowed to be encoded based on the coding rules.

In the real-time pose measurement method of the planar coding target for the vision system, it only requires to collect any local coding pattern 16 that meets the recognition requirements to realize the pose measurement, which simultaneously realizes high-precision, large-range and real-time measurement. Moreover, the planar coding target is configured to encode different areas in a wide range to determine the positions of different areas, and meet the needs of high-precision pose measurement for a wide range.

Figure 12:
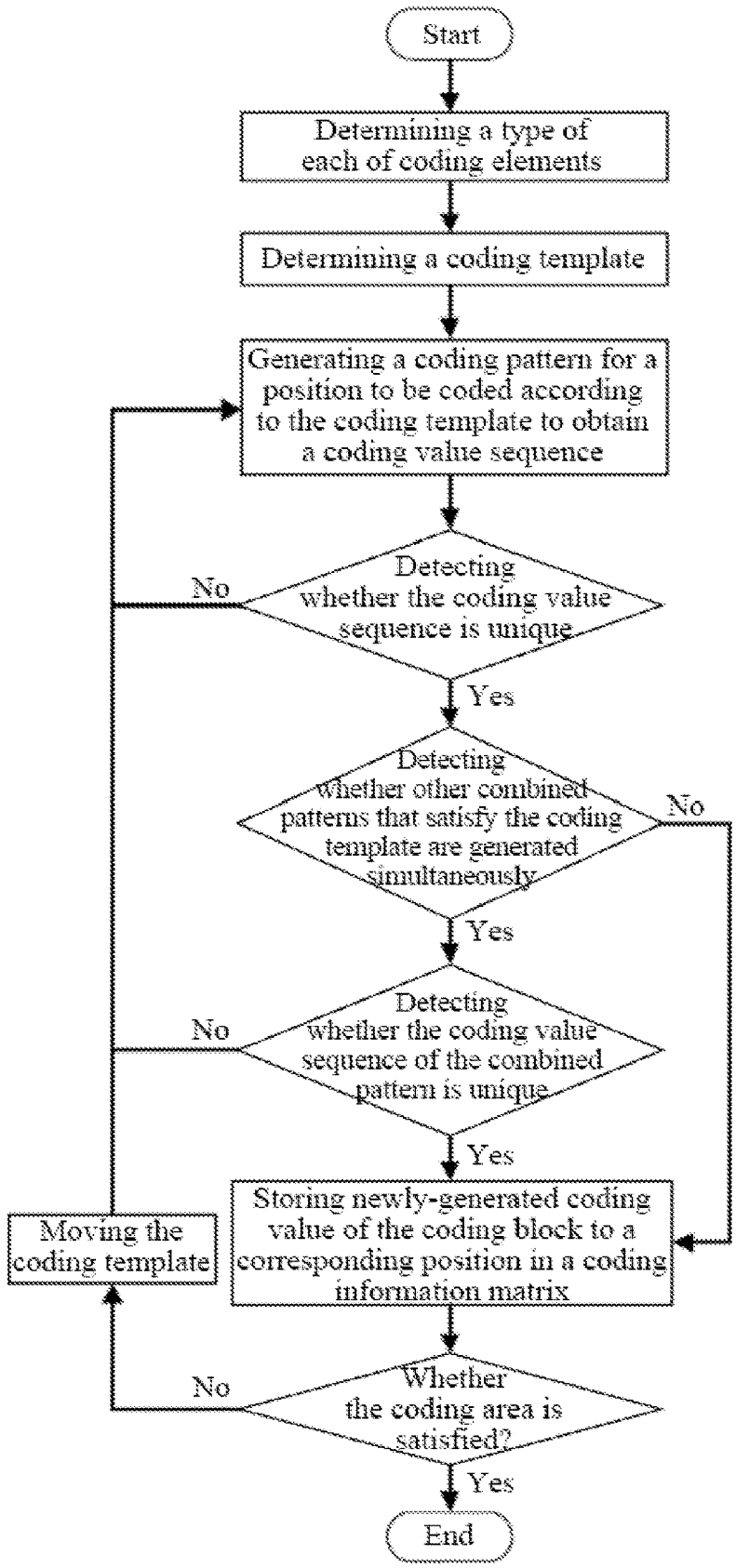
FIG. 12 is a flow chart illustrating the target generation according to an embodiment of this application.

Referring to an embodiment shown in FIG. 12, the step (1) is performed through the following steps.

(A1) According to the requirements of the measurement scene, a type of each of the plurality coding elements 11 is selected, and then the coding block and the coding template 14 are determined in turn.

(A2) The coding template 14 is continuously moved and expanded to generate a coding pattern 16 for a position required to be coded. Various combined patterns of the coding template 14 in the coding pattern 16 are identified, and whether coding value sequences of the various combined patterns are unique and different from each other is determined.

if yes, the various combined patterns are respectively defined as the minimum identification unit pattern 15 contained in the coding pattern 16. A coding information matrix corresponding to the coding pattern 16 is generated. The type and the coding value of each of the coding blocks contained in the coding pattern 16 are stored in corresponding positions of the coding information matrix.

If not, adjacent coding templates 14 are merged to adjust a type of each of the various combined patterns until the coding value sequences of the various combined patterns are unique and different from each other.

(A3) Whether a covering range of the coding pattern 16 reaches a range to be coded of the target board 2 is determined.

If not, the coding template 14 is moved, and step (A2) is performed again.

If yes, the generation of the planar coding target is completed.

Before generating the coding pattern 16, a certain type of coding template 14 is predetermined. The coding template 14 includes a plurality of coding blocks with determined mutual position and an arrangement relationship. In order to effectively determine the rotation orientation of the coding pattern 16, the coding template includes at least one special coding block 12. The rotation orientation of the coding pattern 16 is obtained by determining the rotation orientation of the special coding block 12, so as to obtain the rotation orientation of the coding pattern 16.

The simplest coding template 14 includes only one special coding block 12, and the coding template 14 may not include the conventional coding block 13.

When the coding template 14 includes more than one coding block, the coding blocks contained in the coding template 14 are allowed to be arranged in different distribution modes. The different distribution modes respectively correspond to different coding templates 14. The arrangement relationship should follow certain rules beneficial to generation of the coding pattern 16, identification of the coding pattern 16 and storage of the coding information corresponding to the coding pattern 16. Each coding pattern 16 is generated by a fixed coding template 14, and the arrangement rules of the coding blocks in the coding template 14 are illustrated as follows.

In the coding template 14, each of the coding blocks has the same length w and the same width h, that is, the w is a length of the rectangle ABCD, and the h is a width of the rectangle ABCD. The X-axis and Y-axis of the coordinate system O-XY of each of the coding blocks are oriented in the same direction, respectively, and there is no rotation around the origin.

In the coding template 14, all the special coding blocks 12 have the same configuration, that is, the special coding position of point E is the same in each the special coding block 12.

In the coding template 14, there is no center point O of one coding block that is not passed by the X axis and the Y axis of the coordinate system O-XY of other coding blocks.

In the coding template 14, the direction of the vector $\overrightarrow{O_1O_2}$ formed from the center $O_1$ of a coding block to the center $O_2$ of the adjacent coding block is the same or opposite to the X axis or the Y axis of the coding block. The distance between adjacent coding blocks along the X-axis direction of the coordinate system of each of the coding blocks is defined as $d_{col}$, and the distance between adjacent coding blocks along the Y-axis direction of each of the coding blocks coordinate system is defined as $d_{row}$. $d_{col}$ is indicates the column arrangement distance of coding blocks, and $d_{row}$ indicates the row arrangement distance of coding blocks.

The coding template 14 determines the number of the special coding blocks 12 and the conventional coding blocks 13 and the arrangement relationship between the coding blocks. When generating the coding pattern 16, according to the coding template 14, the coding elements 11 are placed in the corresponding positions to generate a specific pattern of the coding template 14. The pattern generated by the coding template 14 in a single pass is the minimum identification unit in visual measurement, that is, the minimum identification unit pattern 15. The entire coding pattern 16 is generated by continuously moving the position of the coding template 14 and generating a specific pattern for the coding block position of the unencoded area.

When measuring, the vision system is required to acquire at least one complete minimum identification unit pattern 15, so as to calculate the position of the part of the pattern in the planar coding target.

Therefore, any specific pattern that satisfies the coding template 14 (that is, the arrangement relationship of the coding blocks) is the minimum identification unit pattern 15. The position of the coding template 14 is moved, and a specific pattern is generated for the uncoded area according to the coding template 14, and so on and so forth to generate the entire coding pattern 16.

In order to facilitate the identification of the coding pattern 16 and the storage of the coding information, an appropriate coding template 14 and the way of moving and expanding the coding template 14 are designed to make all the coding blocks in the coding pattern 16 distributed spaced apart in a regular array. When generating the coding pattern 16, the coding information is stored in the coding information matrix in units of coding blocks.

In this embodiment, in step (A2), the coding plate is moved and expanded through the following steps.

(A21) A coordinate system O-XY of the coding block is established. A center of the coding block is an origin of the coordinate system O-XY. An X axis in the coordinate system O-XY is parallel to a direction of a vector $\overrightarrow{CD}$ in the rectangle ABCD. and a Y axis in the coordinate system O-XY is parallel to a direction of a vector $\overrightarrow{DB}$ in the rectangle ABCD. Coordinate systems of the at least one coding block in the coding template 14 are the same in X-axis direction and Y-axis direction. A vector $\overrightarrow{O_1O_2}$ pointing from a center $O_1$ of one of the at least one coding block to a center $O_2$ of an adjacent coding block is in the same direction with or opposite to the X axis or Y axis.

(A22) A distance between any two adjacent coding blocks is defined as $d_{col}$ along an X-axis direction of the coordinate system O-XY. A distance between any two adjacent coding blocks is defined as $d_{row}$ along a Y-axis direction of the coordinate system O-XY. The distance $d_{col}$ is defined as a column arrangement distance of the at least one coding block, and the distance $d_{row}$ is defined as a row arrangement distance between of the at least one coding block, and a distance d is defined as an actual array physical distance between the at least one coding block, and $d=d_{col}=d_{row}$.

(A23) The coding template 14 is moved respectively along the X-axis direction and the Y-axis direction of the coordinate system O-XY by an integral multiple of the distance d. The at least one coding block in the coding template 14 are distributed spaced apart in a regular array.

(A24) Whether there is coding block overlapping between a position of the coding template and an area that has been coded during movement of the coding template in step (A23) is determined.

If yes, after moving the coding template 14, a pattern of the coding elements 11 in an area free of coding blocks is generated to form the coding pattern 16.

If not, after moving the coding template 14, it is indicated that the coding template is completely located in an uncoded area, and a pattern the coding elements 11 on the coding blocks on each of the plurality of coding templates 14 is generated to form the coding pattern 16.

In order to make all the plurality of coding blocks in the coding pattern 16 distributed spaced apart in a regular array, the column arrangement distance $d_{col}$ and row arrangement distance $d_{row}$ of each of the plurality of coding blocks in the coding template 14 are set to equal values, that is, $d=d_{col}=d_{row}$. After the pattern is generated by the coding template 14 at a certain position, the coding template 14 is allowed to move to a next uncoded area to generate a coding pattern 14 of the uncoded area, and so on, so as to expand the area of the coding pattern 16. The coding template 14 is allowed to move along the X-axis direction and Y-axis direction of the coordinate system of the coding block therein by an integral multiple of the distance d respectively, ensuring that the coding blocks in the coding pattern 16 are distributed spaced apart in a regular array, avoiding the omission of the uncoded areas when the coding template 14 is moving, and preventing the occurrence of gaps of the coding blocks in a certain area. Since the coding blocks are in an array distribution state, the coding information is allowed to be stored in the coding information matrix in units of coding blocks. For each of the plurality of coding blocks contained in the coding pattern 16, a distribution position relationship in one-to-one correspondence to a column and row position in the coding information matrix is allowed to be established.

After the coding template 14 is moved, the position may overlap with the coded area in a part of the coding blocks, or the position of the coding template 14 is completely in the uncoded area. The processing methods for generating patterns by the above two coding templates 14 after moving are described as follows.

When the coding template is moving to expand the coding pattern 16, the position of the coding template 14 may overlap with some coding blocks in the coded area, and it is only required to generate the pattern of the coding blocks in the uncoded areas after moving, and ensure that the coding value sequence of the newly-generated minimum identification unit pattern 15 is unique, and then the newly-generated coding value of each of the plurality of coding blocks is stored correspondingly in a column and row position in the coding information matrix.

When the coding template 14 is moving to expand the coding pattern 16, the position of the coding template 14 is completely in the unencoded area after moving, and the pattern for the position of each of the coding blocks in the coding template 14 is generated, the coding value sequence of the newly-generated minimum identification unit pattern 15 is ensured to be unique, and finally the newly-generated coding value of each of the plurality of coding blocks is correspondingly stored in a column and row position in the coding information matrix.

A pattern formed by partial combination of two or more adjacent patterns generated by the coding template 14 may also satisfy the requirement of the coding template 14. During the coding process, it requires not only to ensure that the newly generated coding value sequence of the minimum identification unit pattern 15 is unique after the coding template 14 is moved, but also make sure that the coding value sequence of the minimum identification unit pattern 15 formed by the combination of patterns generated by the coding templates 14 is unique.

In conclusion, in the entire coding pattern 16, different minimum identification unit patterns 15 may have a common partial pattern, but in the coding pattern 16, different minimum identification unit patterns 15 conforming to the coding template 14 respectively have a unique coding value sequence.

After the coding pattern 16 is generated, the specific coding pattern 16 and the corresponding coding information matrix are obtained. The coding blocks on the specific coding pattern 16 are in one-to-one correspondence with the row column positions in the coding information matrix. Specifically, the coding blocks are distributed spaced apart in a regular array in the coding pattern 16, and the distribution positions of the coding blocks are corresponding to the column row positions in the coding information matrix. The pattern type and the coding value of the coding block on a certain row and a certain column of the coding pattern 16 is stored on a corresponding column and row position in the coding information matrix.

The coding templates 14 can be varied to expand the capacity and diversity. The coding template 14 is moved to realize the coding of a large area.

Figure 4:
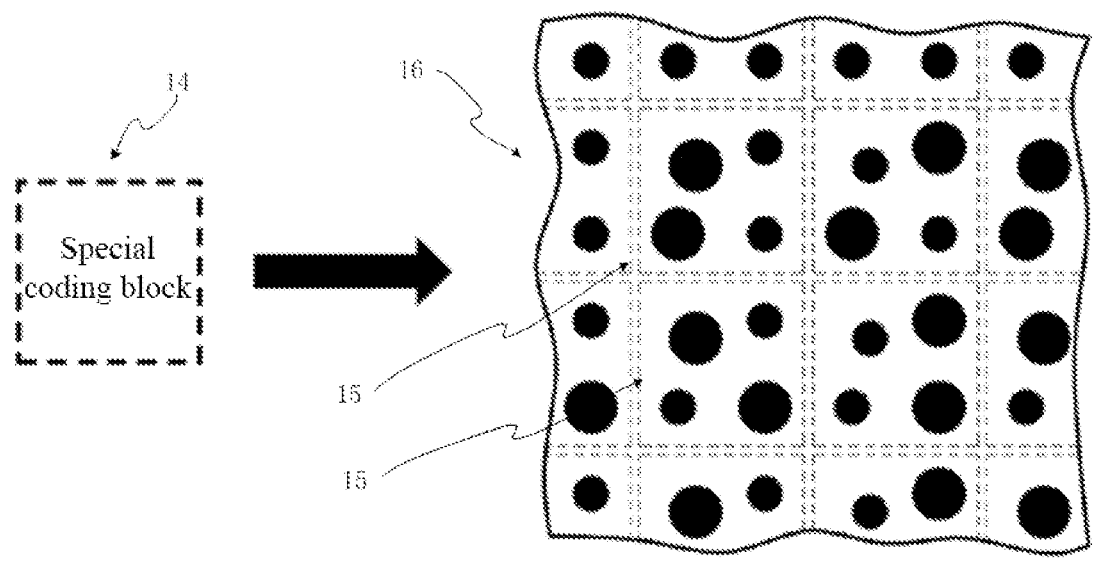
FIG. 4 schematically shows a structure of a coding pattern formed by a coding template including one coding block according to an embodiment of this application.
Figure 5:
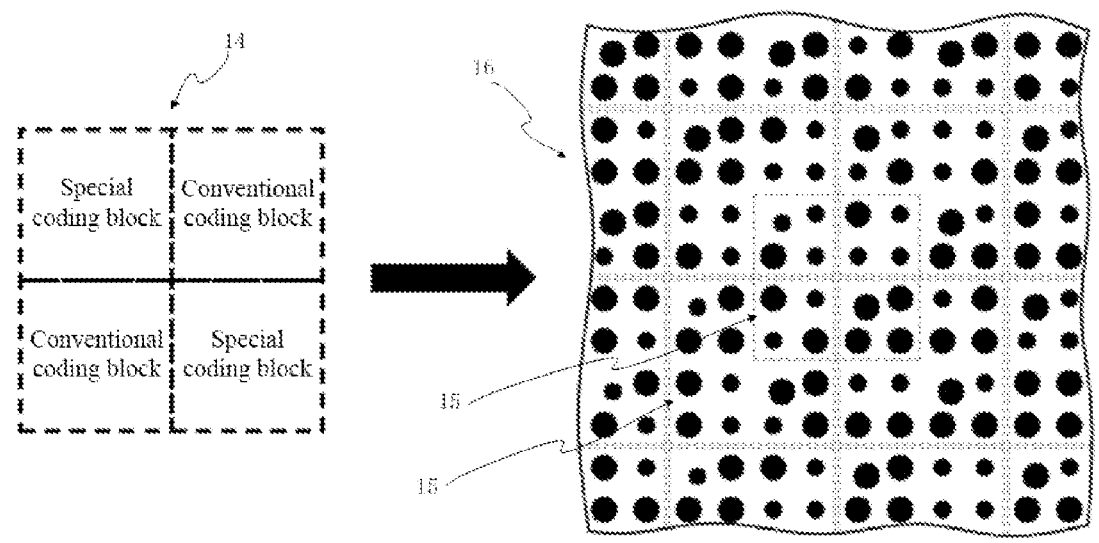
FIG. 5 schematically shows a structure of a coding pattern formed by a coding template including four coding blocks according to an embodiment of this application.
Figure 6:
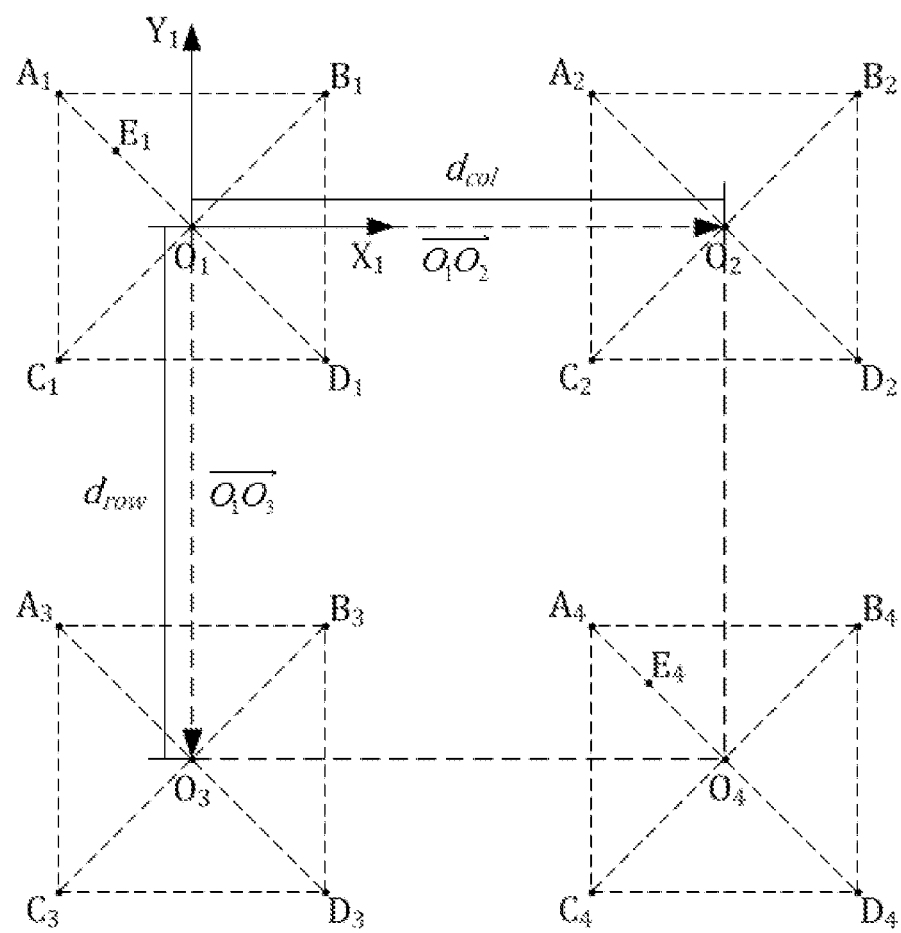
FIG. 6 schematically shows a distribution of four coding blocks in the coding template according to an embodiment of this application.
Figure 7:
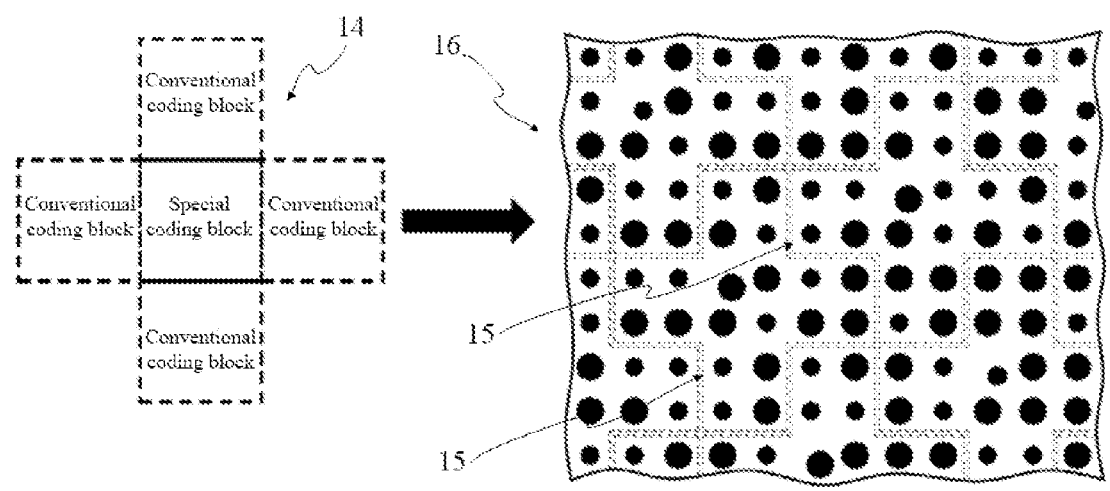
FIG. 7 schematically shows a structure of a coding pattern formed by a coding template including five coding blocks according to an embodiment of this application.
Figure 8:
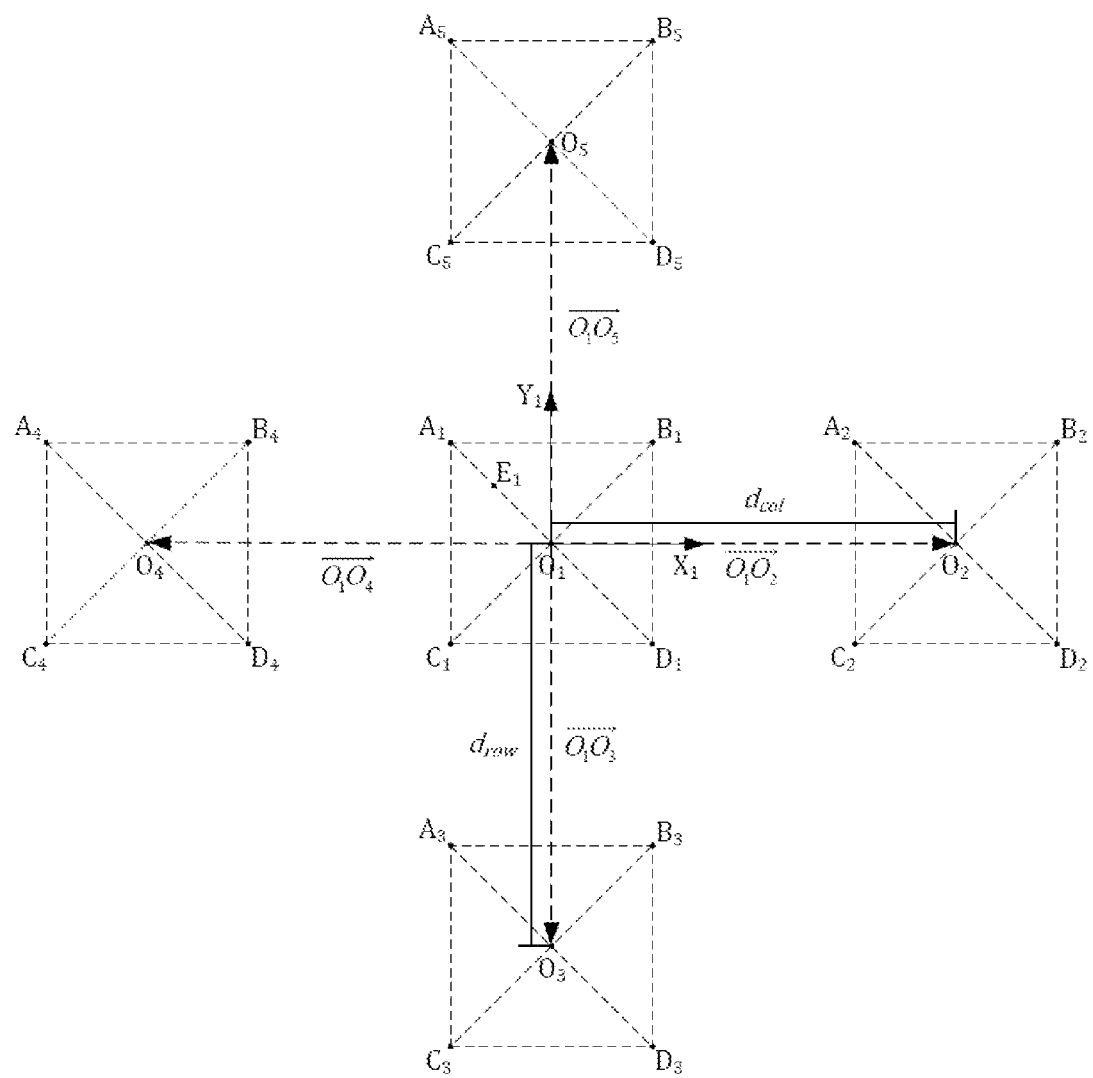
FIG. 8 schematically shows a distribution of the five coding blocks in the coding template according to an embodiment of this application.

Referring to an embodiment shown in FIG. 4, the coding template 14 only includes one special coding block 12. The coding template 14 has no arrangement relationship. Referring to an embodiment shown in FIGS. 5-6, the coding template 14 includes two special coding blocks 12 and two conventional coding blocks 13, all of which are designed under the premise of satisfying the arrangement rules, that is, the two special coding blocks 12 are respectively arranged on a top-left corner and a bottom-right corner, and the two conventional coding blocks 13 are respectively arranged on a bottom left corner and a top right corner. When the coding pattern 16 is generated by moving the coding template 14 without overlapping, the partial patterns of the four adjacent minimum identification unit patterns 15 are combined with each other to form a minimum identification unit pattern 15, which also satisfies the coding template 14 and has a unique coding value sequence. Referring to an embodiment shown in FIGS. 7-8, the coding template 14 includes a special coding block 12 and four conventional coding blocks 13, where the special coding block 12 is distributed in the center, and the four conventional coding blocks 13 are respectively distributed above, below, left and right of the special coding block 12.

During the identification, the column and row position in the coding information matrix corresponding to the coding information of the minimum identification unit pattern 15 is found and acquired by sliding the template in the coding information matrix matching with the coding template 14. Then, according to the actual physical array distance d between the coding blocks, the position of the acquired minimum identification unit pattern 15 in the entire coding pattern 16 is obtained.

In this embodiment, when an object distance is much longer than the focal length, the imaging model of the image acquisition device is allowed to be approximated as a pin-hole imaging model. An origin of the coordinate system $O_c$-$X_c Y_c Z_c$ is an optical center of the image acquisition device. A Z axis of the coordinate system $O_c$-$X_c Y_c Z_c$ is parallel to a direction pointing from the optical center to an optical axis of the target board. A Y axis of the coordinate system $O_c$-$X_c Y_c Z_c$ is parallel to a U axis of the coordinate system O-UV. A X axis of the coordinate system $O_c$-$X_c Y_c Z_c$ is parallel to a V axis of the coordinate system O-UV.

A Z axis of the coordinate system $O_w$-$X_w Y_w Z_w$ is parallel to a plane perpendicular to the planar coding target. An origin of the coordinate system $O_w$-$X_w Y_w Z_w$ is a gravity center of a pattern of a coding element located at a bottom left corner of the planar encoding target; an X axis of the coordinate system $O_w$-$X_w Y_w Z_w$ is parallel to the X-axis direction of the coordinate system O-XY; and a Y axis of the coordinate system $O_w$-$X_w Y_w Z_w$ is parallel to the Y-axis direction of the coordinate system O-XY.

The planar coding target is a pre-designed coding pattern 16. All points on the planar coding target are allowed to be presented on the coordinate system $O_w$-$X_w Y_w Z_w$, and each have a Z-axis coordinate of 0. Referring to an embodiment shown in FIGS. 10-11, $P_0, P_1, \ldots, P_n$ are the gravity centers of the coding elements 11 within the visual field of the image acquisition device 3 on the planar coding target. $I_0, I_1, \ldots, I_n$ are pixel points of the coordinate system O-UV corresponding to the gravity centers of the coding elements 11. $I_0$~$I_n$ are allowed to be obtained by respectively calculating the gravity centers of the coding elements 11, and $P_0$~$P_n$ are allowed to be determined by identifying the positions of the image on the planar coding target.

Under one application scene, the step of "measuring pose change of the object to be measured" is performed as follows.

(C1) The image acquisition device 3 is fixed. The planar coding target is allowed to move with the object to be measured.

(C2) A spatial point (x, y, z) is set. During movement of the object to be measured, the image acquisition device 3 contentiously shoots the local coding pattern of the planar coding target. The image acquisition device 3 contentiously shoots the local coding pattern 16 of the planar coding target. Transformation matrices $R_1$, $T_1$, R' and T' are solved by using the perspective-n-point (PnP) algorithm, where $R_1$ is a rotation matrix before movement of the object to be measured; $T_1$ is a translation matrix before movement of the object to be measured; R' is a rotation matrix after movement of the object to be measured; and T' is a translation matrix after movement of the object to be measured.

Since the spatial point (x, y, z) keeps the same in the coordinate system $O_c$-$X_c Y_c Z_c$ before and after movement of the object to be measured, the following expression is obtained:

$$\begin{bmatrix} x \\ y \\ z \\ 1 \end{bmatrix} = \begin{bmatrix} R_1 & T_1 \\ 0 & 1 \end{bmatrix} \begin{bmatrix} x' \\ y' \\ z' \\ 1 \end{bmatrix} = \begin{bmatrix} R' & T' \\ 0 & 1 \end{bmatrix} \begin{bmatrix} x'' \\ y'' \\ z'' \\ 1 \end{bmatrix} = \begin{bmatrix} R' & T' \\ 0 & 1 \end{bmatrix} \begin{bmatrix} \Delta R & \Delta T \\ 0 & 1 \end{bmatrix} \begin{bmatrix} x' \\ y' \\ z' \\ 1 \end{bmatrix};$$

and the following expression is further obtained:

$$\begin{bmatrix} \Delta R & \Delta T \\ 0 & 1 \end{bmatrix} = \begin{bmatrix} R' & T' \\ 0 & 1 \end{bmatrix}^{-1} \begin{bmatrix} R_1 & T_1 \\ 0 & 1 \end{bmatrix};$$

where (x', y', z') is a coordinate of the spatial point (x, y, z) on the coordinate system $O_w$-$X_w Y_w Z_w$ before movement of the spatial point (x, y, z); (x", y", z") is a coordinate of the spatial point (x, y, z) on a fourth coding target coordinate system $O'_w$-$X'_w Y'_w Z'_w$ of the coding target after movement of the spatial point (x, y, z); and ΔR and ΔT respectively represent a transformation relationship before and after movement of the planar coding target, so as to obtain the pose change of the object to be measured.

As the planar coding target moves with the object to be measured, the image acquisition device 3 is configured to shoot a local part of the coding pattern 16 of the planar coding target to calculate the pose change of the object to be measured in the coordinate system $O_w$-$X_w Y_w Z_w$ relative to the coordinate system $O_c$-$X_c Y_c Z_c$ in real time.

Under another application scene, the step (5) is performed through following steps.

(D1) The planar coding target is fixed. The image acquisition device is allowed to move with the object to be measured.

(D2) A spatial point (x, y, z) is set. During movement of the object to be measured, the image acquisition device 3 contentiously shoots the local coding pattern 16 of the planar coding target. Transformation matrices $R_1$, $T_1$, R' and T' are solved by using the perspective-n-point (PnP) algorithm, where $R_1$ is a rotation matrix before movement of the object to be measured; $T_1$ is a translation matrix before movement of the object to be measured; R' is a rotation matrix after movement of the object to be measured; and T' is a translation matrix after movement of the object to be measured.

Since the spatial point (x, y, z) keeps the same in the coordinate system $O_w$-$X_w Y_w Z_w$ before and after movement of the object to be measured, the following expression is obtained:

$$\begin{cases} \begin{bmatrix} x' \\ y' \\ z' \\ 1 \end{bmatrix} = \begin{bmatrix} R_1 & T_1 \\ 0 & 1 \end{bmatrix} \begin{bmatrix} x \\ y \\ z \\ 1 \end{bmatrix} \\ \begin{bmatrix} x'' \\ y'' \\ z'' \\ 1 \end{bmatrix} = \begin{bmatrix} R' & T' \\ 0 & 1 \end{bmatrix} \begin{bmatrix} x \\ y \\ z \\ 1 \end{bmatrix} ; \\ \begin{bmatrix} x'' \\ y'' \\ z'' \\ 1 \end{bmatrix} = \begin{bmatrix} \Delta R & \Delta T \\ 0 & 1 \end{bmatrix} \begin{bmatrix} x' \\ y' \\ z' \\ 1 \end{bmatrix} \end{cases}$$

and the following expression is further derived, $$\begin{bmatrix} \Delta R & \Delta T \\ 0 & 1 \end{bmatrix} = \begin{bmatrix} R' & T' \\ 0 & 1 \end{bmatrix} \begin{bmatrix} R_1 & T_1 \\ 0 & 1 \end{bmatrix}^{-1};$$

where (x', y', z') is a coordinate of the spatial point (x, y, z) in the coordinate system $O_w$-$X_w Y_w Z_w$ before movement of the spatial point (x, y, z); (x", y", z") is a coordinate of the spatial point (x, y, z) on a coordinate system $O'_w$-$X'_w Y'_w Z'_w$ of the coding target after movement of the spatial point (x, y, z); and ΔR and ΔT respectively represents a transformation relationship before and after movement of the image acquisition device, so as to obtain the pose change of the object to be measured As the image acquisition device 3 moves with the object to be measured, the image acquisition device 3 is configured to shoot a local part of the coding pattern 16 of the planar coding target to calculate the pose change of the fixed coding target in the coordinate system $O_w$-$X_w Y_w Z_w$ relative to the moving coordinate system $O_c$-$X_c Y_c Z_c$ in real time.

The technical principle of this application has been described above with reference to the embodiments, and these embodiments should not be construed as limiting the scope of this application in any way. It should be understood that any modifications, variations and replacements made by those skilled in the art without departing from the scope and spirit of this application should fall within the scope of this application defined by the appended claims.

What is claimed is:

1. A real-time pose measurement method of a planar coding target, wherein the real-time pose measurement method is applied to a vision system comprising the planar coding target, an image acquisition device and a data processing device; the image acquisition device is configured to capture an image of the planar coding target and send the image of the planar coding target to the data processing device for processing;

the planar coding target comprises a coding template, and a coding pattern; the coding template comprises at least one coding bock; each of the at least one coding block comprises four coding elements; a pattern of the coding template is a minimum identification unit pattern; each of the four coding elements has a unique coding value; and coding values of the four coding elements are different from each other;

the four coding elements are distributed in a rectangle ABCD and do not overlap with each other; a center of each of the at least one coding block is an intersection point O of two diagonals of the rectangle ABCD; each of the at least one coding block has a coding value; wherein the coding value of the at least one coding block is associated with a coding value of each of the four coding elements contained in the at least one coding block;

each of the at least one coding block is a special coding block or a conventional coding block; in the special coding block, gravity centers of three of the four coding elements are respectively located at vertexes B, C, D of the rectangle ABCD, and a gravity center of the remaining one of the four coding elements is located in a triangle enclosed by the vertexes A, B and C, and is defined as point E;

in the conventional coding block, gravity centers of the four coding elements are respectively located at vertexes A, B, C and D of the rectangle ABCD;

the at least one coding block has determined mutual position and arrangement relationship; the at least one coding block comprises at least one special coding block; the coding template is configured to mark the at least one coding block each with an integer serial number according to a preset order, so as to generate a coding value of the at least one coding block;

according to the sequence of the at least one coding block on the coding template, coding values of the at least one coding block are obtained in turn to form a coding value sequence $[V_0, V_1, \ldots, V_{K-1}]$ of the minimum identification unit pattern; wherein $V_0, V_1, \ldots, V_{k-1}$ are coding values of the at least one coding block; and K is the number of the at least one coding block in the coding template;

the coding value sequence of the minimum identification unit pattern is unique, and coding value sequences of different minimum identification unit patterns are different from each other;

the coding pattern is generated through continuous movement and expansion of the coding template; the coding pattern covers a surface of a target board; the coding pattern is provided with a corresponding coding information matrix; and the coding information matrix is configured to store type and coding value of each coding block contained in the coding pattern; and the real-time pose measurement method comprises:

(1) generating, by the data processing device, a coding pattern according to requirements of a measurement scene and arranging the coding pattern on the surface of the target board, so as to form the planar coding target;

(2) establishing, by the data processing device, a coordinate system O-UV of the image of the planar coding target, a coordinate system $O_c$-$X_cY_cZ_c$ of the image acquisition device and a coordinate system $O_w$-$X_wY_wZ_w$ of the planar coding target;

(3) solving a rotation matrix R and a translation matrix T by using a perspective-n-point (PnP) algorithm, wherein the rotation matrix R is configured to transform coordinates of a point from the coordinate system $O_w$-$X_wY_wZ_w$ to the coordinate system $O_c$-$X_cY_cZ_c$, and the translation matrix T is configured to transform coordinates of a point from the coordinate system $O_w$-$X_wY_wZ_w$ to the coordinate system $O_c$-$X_cY_cZ_c$;

(4) acquiring a coordinate transformation relationship of an object to be measured between the coordinate system $O_c$-$X_cY_cZ_c$ and the coordinate system $O_w$-$X_wY_wZ_w$, expressed as $P_c = R \cdot P_w + T$;

wherein $P_c$ represents a coordinate of the object to be measured in the coordinate system $O_c$-$X_cY_cZ_c$; and $P_w$ represents a coordinate of the object to be measured in the coordinate system $O_w$-$X_wY_wZ_w$; and (5) continuously shooting, by the image acquisition device, a local coding pattern of the planar coding target during movement of the object to be measured; and calculating, by the data processing device, a pose change of the object to be measured in real time in the coordinate system $O_w$-$X_wY_wZ_w$ relative to the coordinate system $O_c$-$X_cY_cZ_c$.

2. The real-time pose measurement method of claim 1, wherein the serial numbers of the four coding elements are respectively 0, 1, . . . , N−2 and N−1; wherein N is the number of the plurality of coding elements;

in the coding block, serial numbers of the four coding elements are obtained clockwise around a center of the coding block in sequence starting from a coding element located at a top-left corner to obtain a serial number sequence [$v_{TL}$, $v_{TR}$, $v_{BR}$, $v_{BL}$]; wherein $v_{TL}$ is a serial number of the coding element located at the top-left corner; $v_{TR}$ is a serial number of a coding element located at a top-right corner; $v_{BR}$ is a serial number of a coding element located at a bottom-right corner; and $v_{BL}$ is a serial number of a coding element located at a bottom-left corner; and the serial number sequence [$v_{TL}$, $v_{TR}$, $v_{BR}$, $v_{BL}$] is converted into the serial number of the coding block, expressed as follows:

$$V = v_{TL} + N^1 * v_{TR} + N^2 * v_{BR} + N^3 * v_{BL};$$

wherein V is the coding value of the coding block; and a range of the serial number of the coding block is $\{V | 0 \le V \le N^4 - 1, V \in Z\}$; and serial numbers of the at least one coding block in the coding template are respectively 0~K−1; wherein K is the number of the at least one coding block in the coding template.

3. The real-time pose measurement method of claim 1, wherein the point E is a special coding position; and the special coding block is configured to carry rotation orientation information determined based on a relative positional relationship between the point E and the vertex B, vertex C and vertex D.

4. The real-time pose measurement method of claim 1, wherein a pattern of each of the four coding elements is a single geometric shape or a combination of multiple geometric shapes; the four coding elements vary in at least one of attributes; wherein the attributes comprise shape, size, color and transparency;

the at least one special coding block in the coding template is the same in configuration; and the coding pattern is generated by the coding template of the same type; and the at least one coding block in the coding pattern is distributed spaced apart in a regular array; and for each of the at least one coding block contained in the coding pattern, a distribution position is in one-to-one correspondence to a column and row position in the coding information matrix.

5. The real-time pose measurement method of claim 1, wherein the step (1) is performed through steps of:

(A1) according to the requirements of the measurement scene, selecting a type of each of the four coding elements; and determining the coding block and the coding template in turn;

(A2) continuously moving and expanding the coding template to generate a coding pattern for a position to be coded; identifying various combined patterns of the coding template in the coding pattern, and determining whether coding value sequences of the combined patterns are unique and different from each other;

if yes, defining the combined patterns respectively as the minimum identification unit pattern contained in the coding pattern; generating a coding information matrix corresponding to the coding pattern; storing the type and coding value of each of the plurality of coding blocks contained in the coding pattern in corresponding positions of the coding information matrix;

if not, merging adjacent coding templates to adjust a type of the combined patterns until the coding value sequences of the combined patterns are unique and different from each other; and (A3) determining whether a coverage of the coding pattern reaches a required coding range of the target board;

if not, moving the coding template, and performing step (A2) again; and if yes, completing generation of the planar coding target.

6. The real-time pose measurement method of claim 5, wherein in step (A2), the coding plate is moved and expanded through steps of:

(A21) establishing a coordinate system O-XY of the coding block; wherein a center of the coding block is an origin of the coordinate system O-XY; an X axis in the coordinate system O-XY is parallel to a direction of a vector $\overrightarrow{CD}$ in the rectangle ABCD; a Y axis in the coordinate system O-XY is parallel to a direction of a vector $\overrightarrow{DB}$ in the rectangle ABCD; coordinate systems of the at least one coding block in the coding template are the same in X-axis direction and Y-axis direction; a vector $\overrightarrow{O_1O_2}$ pointing from a center $O_1$ of one of the at least one coding block to a center $O_2$ of an adjacent coding block is in the same direction with or opposite to the X axis or Y axis;

(A22) defining a distance between any two adjacent coding blocks as $d_{col}$ along an X-axis direction of the coordinate system O-XY, and defining a distance between any two adjacent coding blocks as $d_{row}$ along a Y-axis direction of the coordinate system O-XY; wherein the distance $d_{col}$ is defined as a column arrangement distance of the at least one coding block, and the distance $d_{row}$ is defined as a row arrangement distance of the at least one coding block; defining a distance d as an actual array physical distance between the at least one coding block; and setting $d=d_{col}=d_{row}$.

(A23) moving the coding template respectively along the X-axis direction and the Y-axis direction of the coordinate system O-XY by an integral multiple of the distance d; wherein the at least one coding block in the coding template are distributed spaced apart in a regular array; and (A24) determining whether there is coding block overlapping between a position of the coding template and an area that has been coded during movement of the coding template in step (A23);

if yes, after moving the coding template, generating a pattern of coding elements in an area free of coding blocks to form the coding pattern; and if not, indicating that the coding template is completely located in an uncoded area; and generating a pattern of the coding elements on each of the plurality of coding blocks on the coding template to form the coding pattern.

7. The real-time pose measurement method of claim 6, wherein an origin of the coordinate system $O_c$-$X_cY_cZ_c$ is an optical center of the image acquisition device; a Z axis of the coordinate system $O_c$-$X_cY_cZ_c$ is parallel to a direction pointing from the optical center to an optical axis of the target board; a Y axis of the coordinate system $O_c$-$X_cY_cZ_c$ is parallel to a U axis of the coordinate system O-UV; a X axis of the coordinate system $O_c$-$X_cY_cZ_c$ is parallel to a V axis of the coordinate system O-UV; and a Z axis of the coordinate system $O_w$-$X_wY_wZ_w$ is parallel to a plane perpendicular to the planar coding target; an origin of the coordinate system $O_w$-$X_wY_wZ_w$ is a gravity center of a pattern of a coding element located at a bottom left corner of the planar encoding target; an X axis of the coordinate system $O_w$-$X_wY_wZ_w$ is parallel to the X-axis direction of the coordinate system O-XY; and a Y axis of the coordinate system $O_w$-$X_wY_wZ_w$ is parallel to the Y-axis direction of the coordinate system O-XY.

8. The real-time pose measurement method of claim 1, wherein the step (5) is performed through steps of:

(C1) fixing the image acquisition device, and allowing the planar coding target to move with the object to be measured; and (C2) setting a spatial point (x, y, z); during movement of the object to be measured, contentiously shooting, by the image acquisition device, the local coding pattern of the planar coding target; solving transformation matrices $R_1$, $T_1$, R' and T' by using the perspective-n-point (PnP) algorithm; wherein $R_1$ is a rotation matrix before movement of the object to be measured; $T_1$ is a translation matrix before movement of the object to be measured; R' is a rotation matrix after movement of the object to be measured; and T' is a translation matrix after movement of the object to be measured;

since the spatial point (x, y, z) keeps the same in the coordinate system $O_c$-$X_cY_cZ_c$ before and after movement of the object to be measured, the following expression is obtained:

$$\begin{bmatrix} x \\ y \\ z \\ 1 \end{bmatrix} = \begin{bmatrix} R_1 & T_1 \\ 0 & 1 \end{bmatrix} \begin{bmatrix} x' \\ y' \\ z' \\ 1 \end{bmatrix} = \begin{bmatrix} R' & T' \\ 0 & 1 \end{bmatrix} \begin{bmatrix} x'' \\ y'' \\ z'' \\ 1 \end{bmatrix} = \begin{bmatrix} R' & T' \\ 0 & 1 \end{bmatrix} \begin{bmatrix} \Delta R & \Delta T \\ 0 & 1 \end{bmatrix} \begin{bmatrix} x' \\ y' \\ z' \\ 1 \end{bmatrix};$$

and the following expression is further obtained:

$$\begin{bmatrix} \Delta R & \Delta T \\ 0 & 1 \end{bmatrix} = \begin{bmatrix} R' & T' \\ 0 & 1 \end{bmatrix}^{-1} \begin{bmatrix} R_1 & T_1 \\ 0 & 1 \end{bmatrix};$$

wherein (x', y', z') is a coordinate of the spatial point (x, y, z) on the coordinate system $O_w$-$X_wY_wZ_w$ before movement of the spatial point (x, y, z); (x", y", z") is a coordinate of the spatial point (x, y, z) on a coordinate system $O'_w$-$X'_wY'_wZ'_w$ of the coding target after movement of the spatial point (x, y, z); and $\Delta R$ and $\Delta T$ respectively represents a transformation relationship before and after movement of the planar coding target, so as to obtain the pose change of the object to be measured.

9. The real-time pose measurement method of claim 1, wherein the step (5) is performed through steps of:

(D1) fixing the planar coding target; and allowing the image acquisition device to move with the object to be measured; and (D2) setting a spatial point (x, y, z); during movement of the object to be measured, contentiously shooting, by the image acquisition device, the local coding pattern of the planar coding target; solving transformation matrices $R_1$, $T_1$, R' and T' by using the perspective-n-point (PnP) algorithm; wherein $R_1$ is a rotation matrix before movement of the object to be measured; $T_1$ is a translation matrix before movement of the object to be measured; R' is a rotation matrix after movement of the object to be measured; and T' is a translation matrix after movement of the object to be measured;

since the spatial point (x, y, z) keeps the same in the coordinate system $O_w$-$X_wY_wZ_w$ before and after movement of the object to be measured, the following expression is obtained:

$$\begin{cases} \begin{bmatrix} x' \\ y' \\ z' \\ 1 \end{bmatrix} = \begin{bmatrix} R_1 & T_1 \\ 0 & 1 \end{bmatrix} \begin{bmatrix} x \\ y \\ z \\ 1 \end{bmatrix} \\ \begin{bmatrix} x'' \\ y'' \\ z'' \\ 1 \end{bmatrix} = \begin{bmatrix} R' & T' \\ 0 & 1 \end{bmatrix} \begin{bmatrix} x \\ y \\ z \\ 1 \end{bmatrix} \\ \begin{bmatrix} x'' \\ y'' \\ z'' \\ 1 \end{bmatrix} = \begin{bmatrix} \Delta R & \Delta T \\ 0 & 1 \end{bmatrix} \begin{bmatrix} x' \\ y' \\ z' \\ 1 \end{bmatrix} \end{cases};$$

and the following expression is further derived, $$\begin{bmatrix} \Delta R & \Delta T \\ 0 & 1 \end{bmatrix} = \begin{bmatrix} R' & T' \\ 0 & 1 \end{bmatrix} \begin{bmatrix} R_1 & T_1 \\ 0 & 1 \end{bmatrix}^{-1};$$

wherein (x', y', z') is a coordinate of the spatial point (x, y, z) in the coordinate system $O_w$-$X_wY_wZ_w$ before movement of the spatial point (x, y, z); (x", y", z") is a coordinate of the spatial point (x, y, z) on a coordinate system $O'_w\text{-}X'_w Y'_w Z'_w$ of the coding target after movement of the spatial point (x, y, z); and $\Delta R$ and $\Delta T$ respectively represents a transformation relationship before and after movement of the image acquisition device so as to obtain the pose change of the object to be measured.

\* \* \* \* \*